June 25, 1929.  F. BROWN  1,718,892
AIRPLANE
Filed July 28, 1926   3 Sheets-Sheet 1
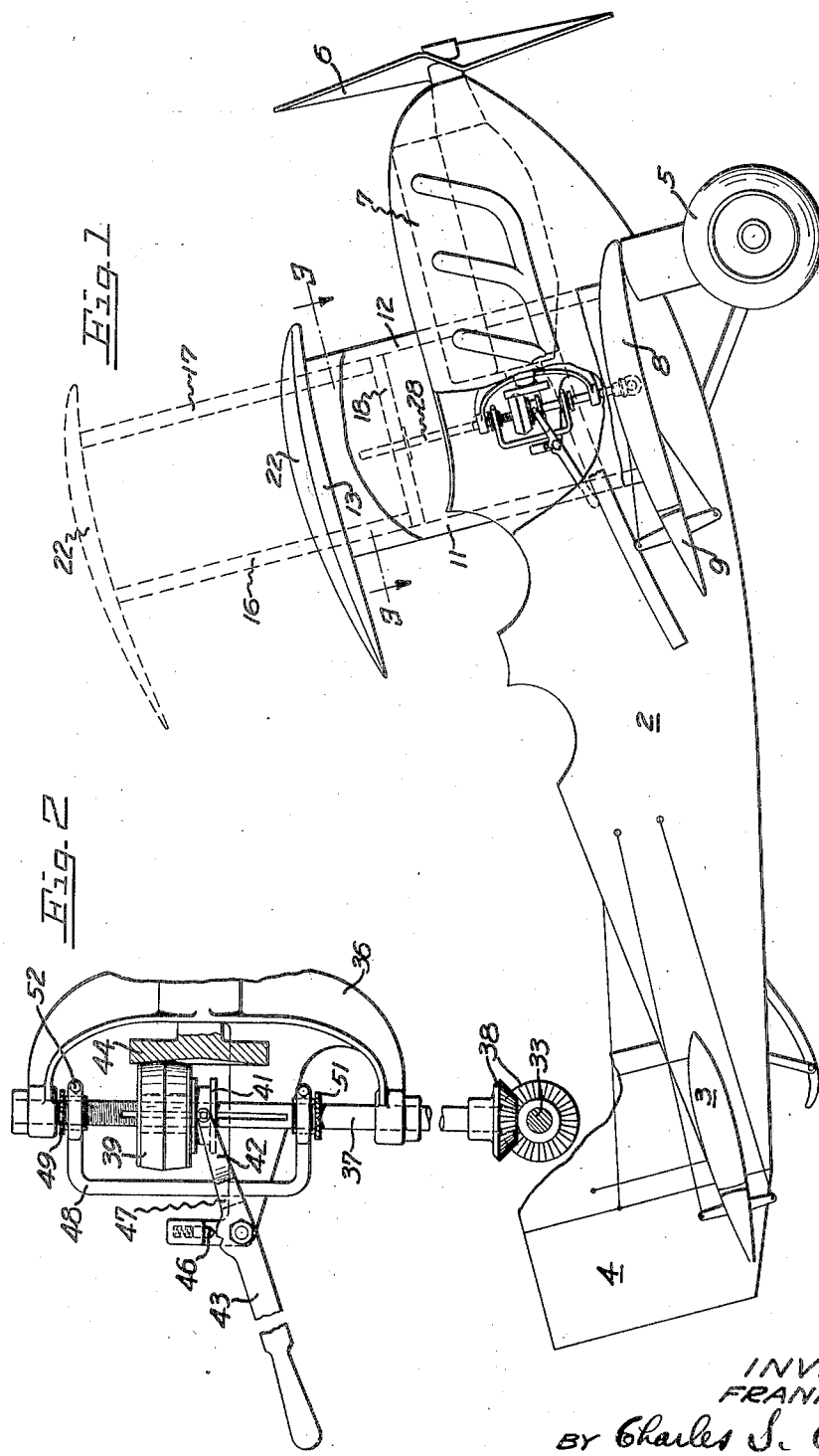
INVENTOR
FRANK BROWN
BY Charles S. Evans
HIS ATTORNEY.

June 25, 1929.  F. BROWN  1,718,892
AIRPLANE
Filed July 28, 1926   3 Sheets-Sheet 2
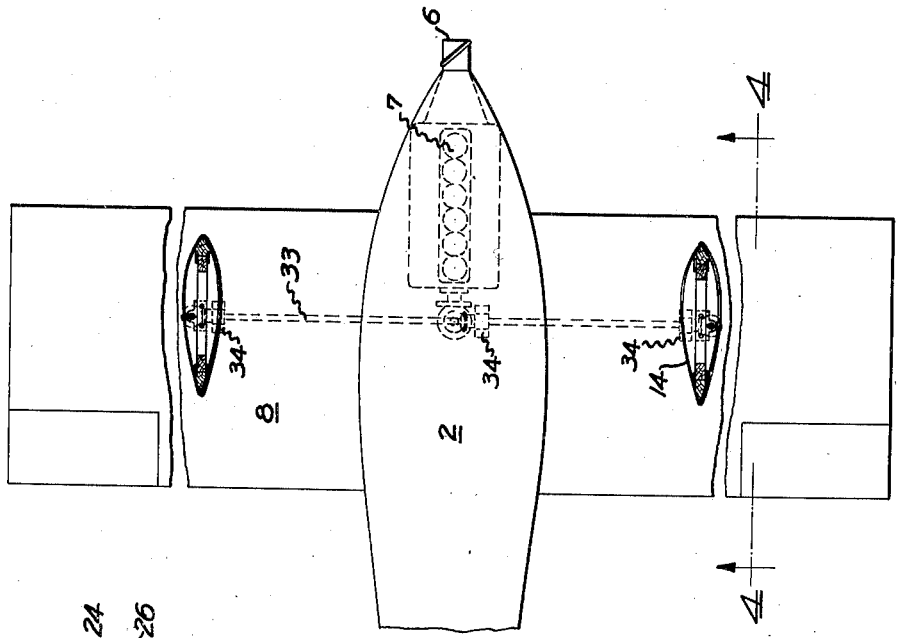
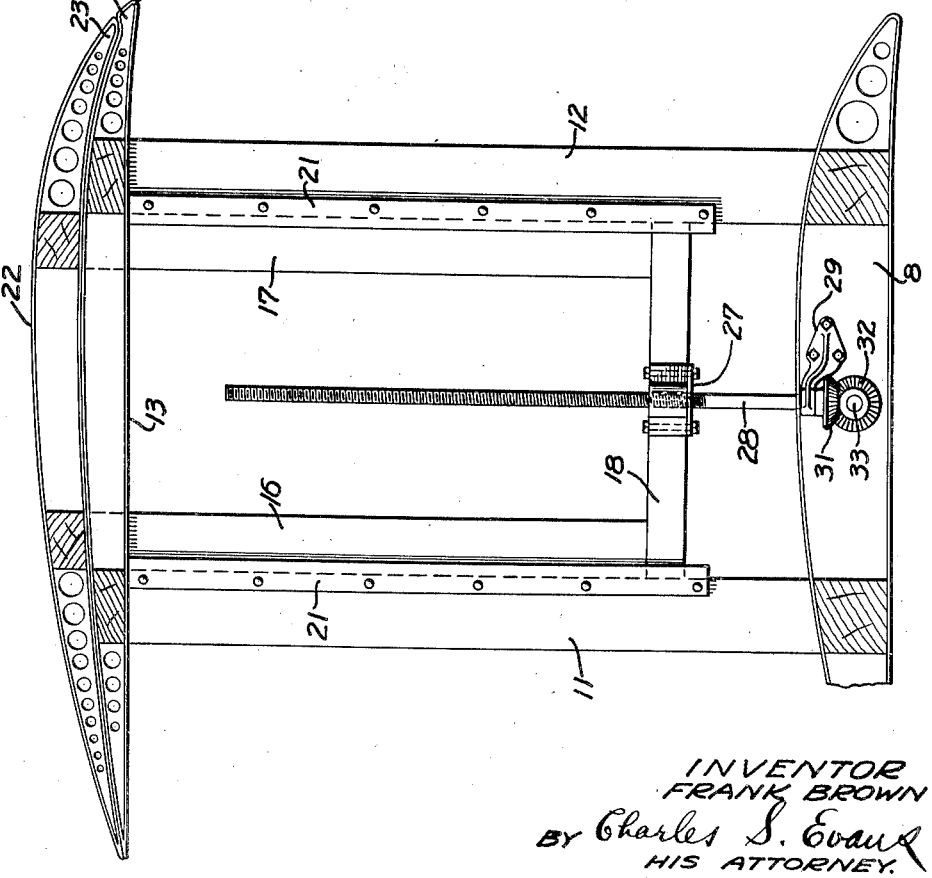
INVENTOR
FRANK BROWN
BY Charles S. Evans
HIS ATTORNEY.

June 25, 1929.
F. BROWN
1,718,892
AIRPLANE
Filed July 28, 1926
3 Sheets-Sheet 3
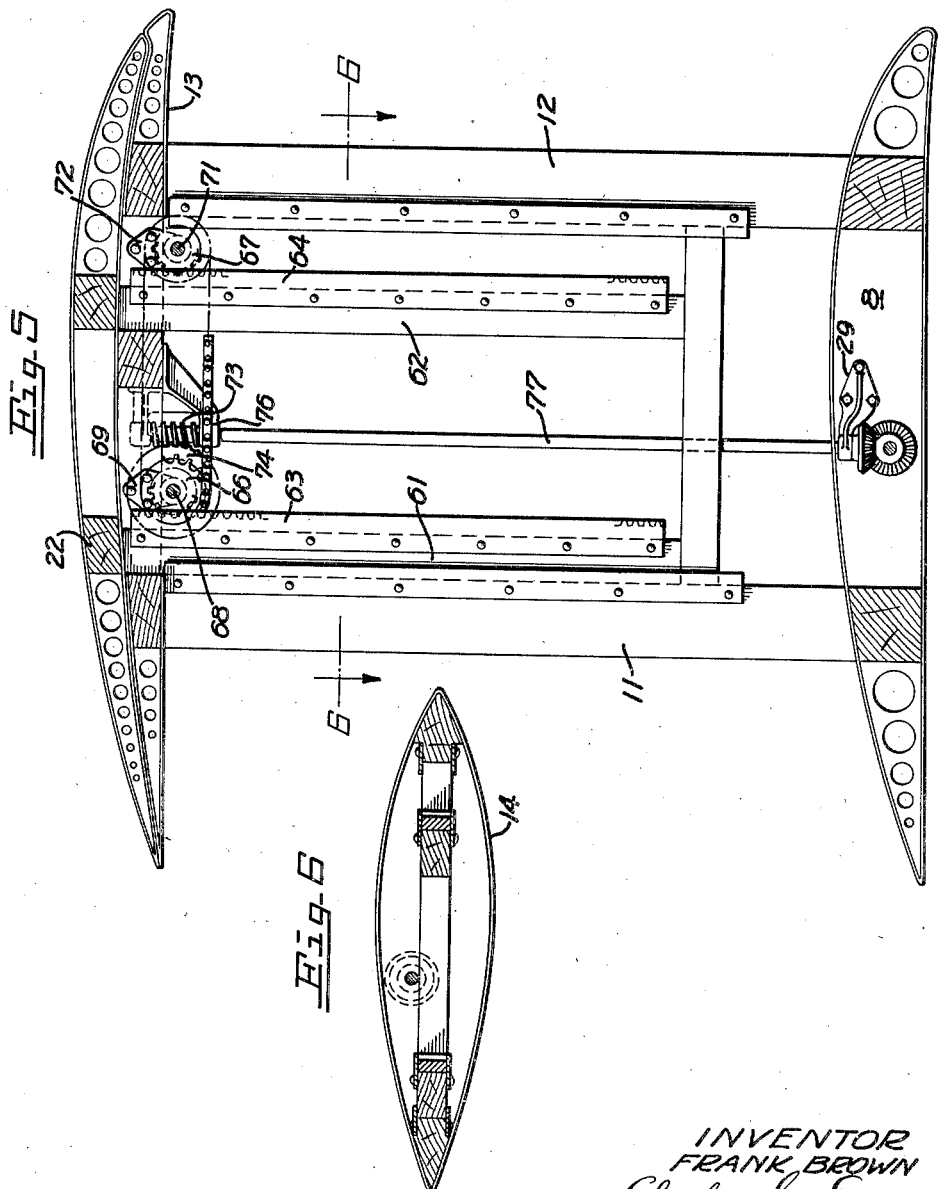
INVENTOR
FRANK BROWN
BY Charles S. Evans
HIS ATTORNEY.

Patented June 25, 1929.

1,718,892

UNITED STATES PATENT OFFICE.

FRANK BROWN, OF BERKELEY, CALIFORNIA.

AIRPLANE.

Application filed July 28, 1926. Serial No. 125,351.

My invention relates to airplanes and particularly to airplane wings; and one of the objects of the invention is the provision of an airplane embodying a wing comprising twin sections adapted to be separated into two wings or closed into a single wing as conditions may dictate.

Another object of the invention is the provision of an airplane of the character described embodying means for the ready control of the composite wing.

Other objects of the invention will be set forth in the description of the preferred embodiment of my invention which is illustrated in the drawings forming a part of the specification. It is understood that I do not limit myself to the showing made by the said description and drawings as I may adopt variations of my preferred embodiment within the scope of my invention as set forth in the claims.

Referring to the drawings:

Figure 1 is a side elevation of an airplane embodying my improved composite wing. A portion of the fuselage is shown broken away to disclose the underlying structure and the extended position of the movable wing section is indicated in dashed lines.

Figure 2 is a detail in side elevation showing the clutch mechanism for operating the movable wing section.

Figure 3 is a plan view of the lower wing of the airplane and a portion of the fuselage, the vertical strut structure being shown in section. The plane in which the section is taken is indicated by the line 3—3 of Figure 1.

Figure 4 is a vertical sectional view thru the wing structure of the airplane, the plane of section being indicated by the line 4—4 of Figure 3.

Figure 5 is a vertical section similar to that of Figure 4 but showing a modified form of the wing structure.

Figure 6 is a horizontal sectional view of the structure shown in Figure 5, the plane of section being indicated by the line 6—6 of Figure 5.

In broadly descriptive terms, the device of my invention comprises an airplane having a composite wing, consisting of twin sections so arranged as to function as a single wing when the sections are closed and as two wings of substantially equal lifting power when the sections are separated. One of the wing sections is preferably fixed and the other wing section is slidably mounted relative to the fixed section, so that the movable section may be superposed upon the fixed section in close engagement therewith or extended from the fixed section, both sections then functioning as independent wings. This structure places it within the power of the pilot to increase or decrease the supporting surface of the airplane at will. When the pilot increases the amount of the supporting wing surface, the load in pounds per square foot of wing surface is decreased, with the result that the minimum speed necessary to sustain the plane in the air is decreased, thus making possible a slower landing speed and a slower take-off speed. In a plane which is loaded to capacity it is sometimes difficult or even impossible to attain a flying speed at the take-off unless there is a favoring wind. With the twin sections of my composite wing extended, the load carrying capacity of the composite wing is substantially doubled so that a flying speed is attained without difficulty. After the plane is in the air, the wing sections may be closed so that the normal speed of the plane may be maintained in the air. On long non-stop flights, where a considerable portion of the load is the fuel for the engine, an airplane built in accordance with my invention is enabled to leave the flying field with a greater load than otherwise would be possible. After several hours of flight when the load has been materially decreased thru the consumption of fuel, the composite wing sections may be closed and the balance of the trip made at a greater speed owing to the elimination of the resistance of the extended wing section. From the above it will be understood that a monoplane embodying my composite wing may be converted at will into a biplane, and a biplane embodying the composite wing may be converted into a triplane, in each case with corresponding increase in load carrying capacity, and if we assume a given load this capacity may be expressed in terms of decreased take-off and landing speeds.

More particularly, and with special reference to a biplane, my airplane structure comprises a fuselage 2, with elevators 3, rudder 4, landing gear 5, propeller 6, and engine 7, all of well-known or desired construction. The lower wing 8 is also of the usual construction with ailerons 9 controlled in the usual way. Extending upwardly from the lower wing 8, on each side of the fuselage, are vertical struts 11 and 12 rigidly connected at their upper ends to the wing section 13 comprising the lower half of the composite wing. The struts 11 and 12 may be regarded as a frame on which the fixed wing section 13 is mounted and may be enclosed in the usual way with a streamlined housing 14. Slidably arranged in this frame is a second frame comprising the struts 16 and 17 and suitable cross members including the bars 18. Any suitable means may be used for slidably mounting the movable frame in the fixed frame, but I prefer to use plates 21 secured to the sides of the struts 11 and 12 as shown in Figure 4 to provide slide-ways in which the struts 16 and 17 respectively may move. Rigidly secured on the top of the frame formed by the movable struts is the wing section 22, the lower surface of which is complementary to the upper surface of the fixed wing section 13 so that the two may be positioned closely together to function as one wing. In order to prevent wind resistance on the forward or leading edge of the composite wing from tending to separate the wings, I form the nose 23 of the movable wing section with a rather sharp edge which is partially enclosed by the upwardly extending bead 24 in the leading edge or nose 26 of the fixed section.

Means are provided for extending the movable frame and its attached wing section from the fixed frame and its attached wing section, so that both wing sections may function independently as wings to substantially double the load carrying capacity of the united or closed sections. Secured on the side of each of the cross members 18 at the bottom of the movable frame is a nut 27 thru which is threaded a spindle 28, suitably journaled in bearing 29 fixed on the lower wing section 8, and provided at its lower end with a beveled gear 31. Each of the beveled gears is in mesh with a gear 32 fixed on the end of a shaft 33 extending longitudinally in the wing 8 between the struts and journaled in the bearings 34 suitably disposed in the wing. Rotation of the shaft 33 therefore results in the simultaneous rotation of the threaded spindles 28 and the corresponding movement of the slidable frame and the movable wing section.

Means are provided for driving the shaft 33 in either direction from the motor 7 of the airplane. Journaled in the bracket 36 preferably secured to the frame of the engine 7 is a drive shaft 37, the lower end of which is connected by the gears 38 with the shaft 33. Splined upon the drive shaft 37 is a friction wheel 39, having a grooved hub 41, engaged by a yoke 42 on the end of the control lever 43, so that the friction wheel may be moved back and forth on the drive shaft. The friction wheel is formed with a crowned face adapted to engage the periphery, on either side, of the dished or hollow friction disk 44, which is mounted to rotate with the crank shaft of the engine, being connected directly thereto or geared thereto if a reduction of speed is desirable. A spring-pressed pin 46 engaging a notch in the control lever resiliently retains the friction wheel in its neutral position opposite the center of rotation of the friction disk, and movement of the lever 43 in either direction at the will of the pilot engages the friction wheel and disk to effect a driving connection therebetween and rotation of the driving shaft 37.

Since the movement of the slidable frame and attached wing section is limited in both directions, means are provided for automatically disconnecting the friction wheel from the disk when the movable frame has reached the limit of its movement in either direction. Extending thru a slot 47 in the control lever 43 is a yoke 48, in the ends of which are adjustably mounted nuts 49 and 51. The nuts are threaded into the split ends of the yoke arms and secured in adjusted position by bolts 52. One of the nuts 51 is slidable on the drive shaft 37, but the other nut 49 is threaded upon the shaft, so that rotation of the shaft moves the yoke 48 up or down as the case may be. The parts are arranged and adjusted so that when the friction wheel 39 is thrown upwardly into engagement with the periphery of the friction disk 44, the ensuing rotation of the drive shaft 37 moves the yoke 48 downwardly. When the movable frame approaches the limit of its movement the inner face of the nut 49 engages the friction wheel 39 and moves it along the shaft 37 and out of driving engagement with the friction disk, whereupon the rotation of the shafts controlling the movement of the movable frame ceases and since the connections are irreversible, the movable frame remains in the position to which it is moved without the need for further securing means. When the friction wheel is moved downwardly by the control lever to engage the opposite side of the driving disk 44, rotation of the shaft 37 is in the opposite direction and is accomplished by corresponding movement of the yoke 48 and disengagement of the friction wheel 39 by contact of the inner face of the nut 51, stopping the movement of the movable frame in its opposite position. It will be noted that this automatic control of the wing moving devices will be accomplished whether or not the pilot is holding the control lever 43; and proper manipulation of the movable wing section contemplates that the pilot will raise or lower the control lever until the automatic release of the frictional wheel moves the lever, whereupon he sets it in neutral position until it is again necessary to extend or retract the movable wing section.

While I have shown only the lower wing 8 with the ailerons, it will be understood that the fixed wing section 13 may be constructed with such ailerons in which case the movable wing section may extend only from the aileron surfaces forwardly, or extend between the aileron surfaces.

In Figure 5 of the drawings I have shown another embodiment of my invention in which the movable frame comprises struts 61 and 62 each faced with a rack 63 and 64, the teeth of which are in mesh with gears 66 and 67 respectively. The gears 66 are fixed on a longitudinally extending shaft 68 journaled in the bearings 69 secured in the fixed wing section 13. The gears 67 are fixed on a similar shaft 71 journaled in the bearings 72 secured in the fixed wing section 13. Each of these shafts 68 and 71 has a sprocket and the sprockets are connected by a chain 76 so that the shafts move together. The shaft 68 is also provided with a worm wheel 74 in mesh with the worm 73 fixed on a vertical shaft 77 corresponding to the threaded shaft 28 shown in Figure 4 and similarly driven. Rotation of the shaft 77 rotates the shaft 68 and connected shaft 71, and effects the retraction or extension of the movable frame carrying the movable wing section 22 by the engagement of the gears 66 and 67 in the racks 63 and 64 respectively.

I claim:

1. In an airplane, a wing comprising twin sections, a fixed frame for mounting one of the sections, a second frame slidably arranged on the fixed frame, and on which the other wing section is mounted, a rotatable shaft for controlling the adjustment of the slidable frame on the fixed frame, means for optionally turning said shaft in either direction and means for automatically stopping said turning means to limit movement of said slidable frame.

2. In an airplane, a wing comprising twin sections, a fixed frame for mounting one of the sections, a second frame slidably arranged on the fixed frame and on which the other wing section is mounted, means interposed between the frames for adjusting the slidable frame in the fixed frame, and means for automatically stopping said adjusting means to limit movement of said slidable frame.

3. In an airplane having a motor, a wing comprising twin sections, a fixed frame for mounting one of the sections, a slidable frame arranged on the fixed frame and for mounting the other section, means driven by said motor for moving the slidable frame on the fixed frame, and means for automatically stopping said driving means to limit movement of said slidable frame.

4. In an airplane, a wing comprising twin sections, a fixed frame for mounting one of the sections, a second frame slidably arranged on the fixed frame and on which the other wing section is mounted, a threaded shaft journaled on one of the frames and connected to move the other frame by rotation of the shaft, a drive shaft having a friction wheel mounted thereon, means for connecting the drive shaft and threaded shaft for rotation together, a friction disk adapted to engage the friction wheel, and means for turning the friction disk.

5. In an airplane having a motor, a wing comprising twin sections, a fixed frame for mounting one of the sections, a second frame slidably arranged on the fixed frame and on which the other wing section is mounted, a threaded shaft journaled on one of the frames and connected to move the other frame by rotation of the shaft, a drive shaft having a friction wheel mounted thereon, means for connecting the drive shaft and threaded shaft for rotation together, a friction disk adapted to engage the friction wheel, and means for driving the friction disk from said motor.

6. In an airplane having a motor, a wing comprising twin sections, a fixed frame for mounting one of the sections, a second frame slidably arranged on the fixed frame and on which the other wing section is mounted, a threaded shaft journaled on one of the frames and connected to move the other frame by rotation of the shaft, a drive shaft having a friction wheel slidably mounted thereon, means for moving the friction wheel, means for connecting the drive shaft and threaded shaft for rotation together, a friction disk adapted to engage the periphery of the friction wheel, and means for driving the friction disk from the motor.

7. In an airplane having a motor, a wing comprising twin sections, a fixed frame for mounting one of the sections, a second frame slidably arranged on the fixed frame and on which the other wing section is mounted, a threaded shaft journaled on one of the frames and connected to move the other frame by rotation of the shaft, a drive shaft having a crowned face friction wheel slidably mounted thereon, means for moving the friction wheel, means for connecting the drive shaft and threaded shaft for rotation together, a dished friction disk adapted to engage the periphery of the friction wheel, and means for driving the friction disk from the motor.

8. In an airplane having a motor, a wing comprising twin sections, a fixed frame for mounting one of the sections, a second frame slidably arranged on the fixed frame and on which the other wing section is mounted, a threaded shaft journaled on one of the frames and connected to move the other frame by rotation of the shaft, a drive shaft having a friction wheel slidably mounted thereon, means for moving the friction wheel, means for connecting the drive shaft and threaded shaft for rotation together, a friction disk adapted to engage the periphery of the friction wheel, means for automatically halting rotation of the drive shaft, and means for driving the friction disk from the motor.

9. In an airplane, a wing comprising twin sections, a fixed frame for mounting one of the sections one of which is adapted for raising and lowering with respect to the other section, plates secured to the fixed frame and providing slideways, a second frame slidably mounted in the slideways and on which the other wing section is mounted, a cross member on said second frame, a threaded shaft in engagement with the cross member, and means for optionally turning the shaft in either direction to raise or lower the movable section.

In testimony whereof, I have hereunto set my hand.

FRANK BROWN.